June 5, 1962  F. H. GINDROZ, JR  3,037,399
AUTOMATIC TRANSMISSION
Filed May 9, 1960  4 Sheets-Sheet 1

INVENTOR
FRANK GINDROZ JR.
BY Scrivener + Parker
ATTORNEYS

INVENTOR
FRANK GINDROZ JR.

BY Scrivener & Parker
ATTORNEYS

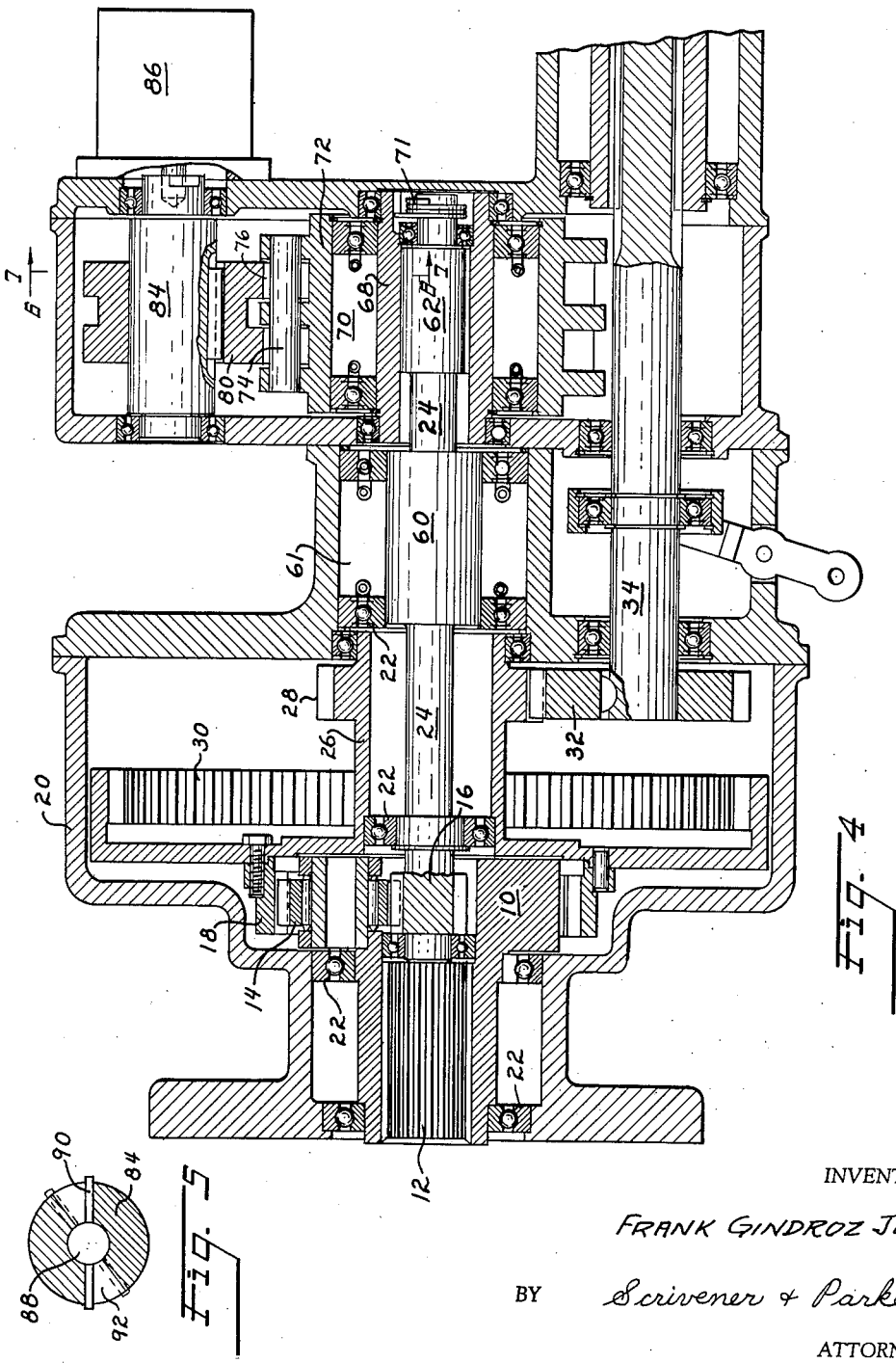

June 5, 1962　　F. H. GINDROZ, JR　　3,037,399
AUTOMATIC TRANSMISSION

Filed May 9, 1960　　　　　　　　　　　　4 Sheets-Sheet 4

Unlatched

Latched

INVENTOR
FRANK GINDROZ JR.
BY Scrivener & Parker
ATTORNEYS

United States Patent Office 3,037,399
Patented June 5, 1962

3,037,399
AUTOMATIC TRANSMISSION
Frank H. Gindroz, Jr., Torrance, Calif., assignor to Electronic Specialty Co., Los Angeles, Calif., a corporation of California
Filed May 9, 1960, Ser. No. 27,754
7 Claims. (Cl. 74—752)

This invention relates to automatic transmissions and more particularly to an automatic transmission in which the overall gear reduction varies uniformly with road speed.

Automatic transmissions have been devised in the past which approximate the ideal gear reduction vs. road speed characteristics of a vehicle or the like by a plurality of shifts which approximate the ideal conditions. Transmissions of this type are highly complex and incorporate devices such as hydraulic torque converters which are extremely expensive.

It is an object of this invention to provide an automatic transmission having high operating efficiency throughout all speed ranges.

Another object of this invention is to provide an automatic transmission in which the gear reduction uniformly changes from a maximum value, through "direct drive" and into "overdrive" without steps or shifts.

Another object of this invention is to provide an automatic transmission in which the gear reduction provided at any instant is the optimum value for the particular road speed at the same instant.

Another object of this invention is to provide an automatic transmission which is rugged in construction and dependable in operation.

Another object of this invention is to provide an automatic transmission which may be mass produced at a lower cost than present transmissions.

These and other objects of this invention will become apparent from the following specification and drawings which relate to preferred embodiments of the invention.

In the drawings:

FIG. 4 is a cross section of another embodiment of the invention similar to FIG. 1 but taken along a different plane;

FIG. 5 is a detailed cross section taken along line 5—5 of FIG. 4; and

Basically, the invention resides in an automatic transmission having a planetary input section comprising a driven planet gear interengaged with a fixed speed sun gear for driving an output ring gear. The speed of the sun gear is controlled by a timing and locking device which provides for a variable gear reduction in the planetary system as a function of motor speed.

Figure 1:
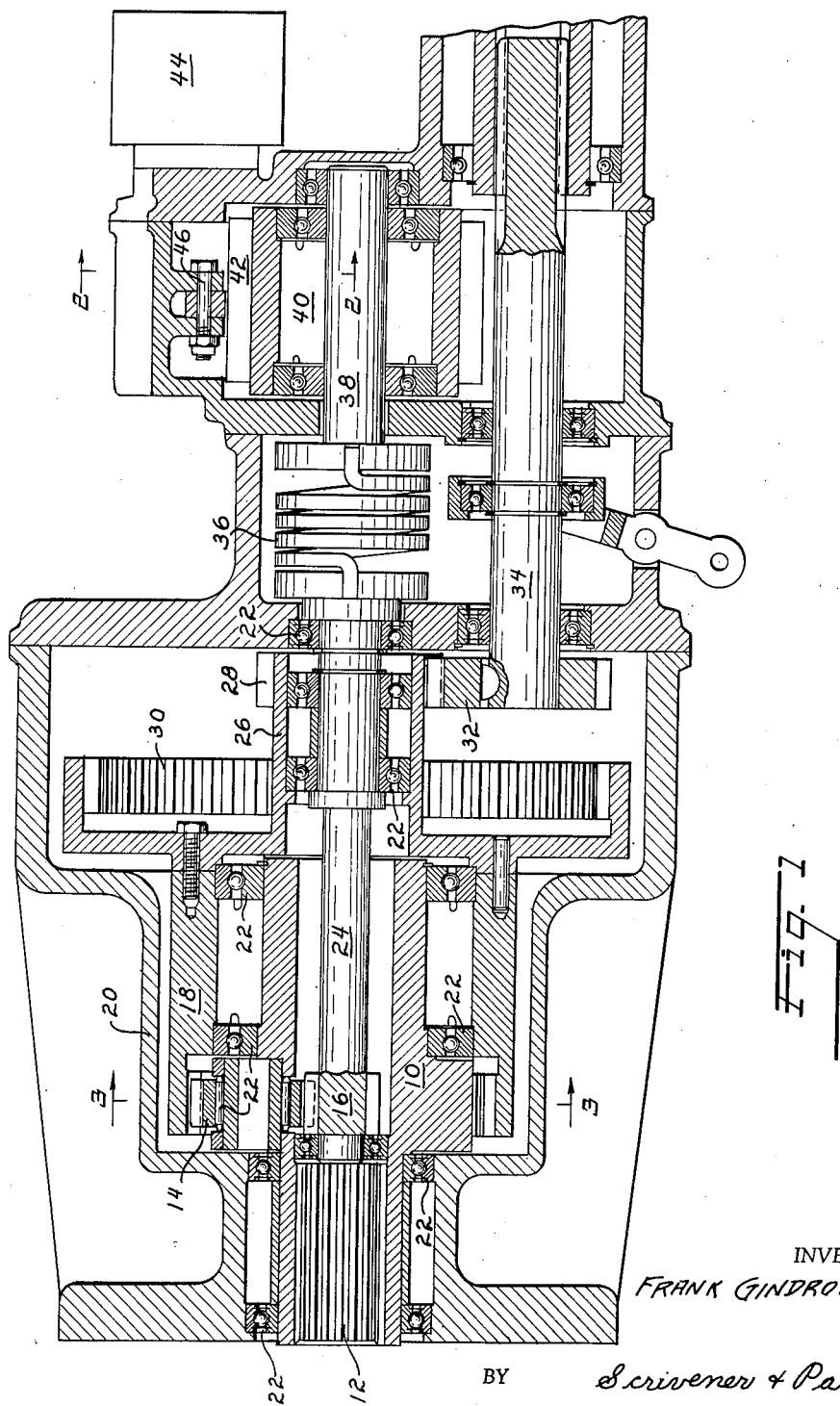
FIG. 1 is a longitudinal cross section of one embodiment of the invention.

Referring in detail to the drawings and more particularly to FIG. 1, a power input means 10 is shown having internal splines 12 thereon for engagement with the drive shaft of a suitable engine or motor (not shown).

The input means 10 includes a planet carrier having a planet gear 14 mounted thereon for orbital movement with respect to a fixed speed sun gear 16 which is internally concentric with the input means 10.

Externally concentric to the input means 10 and also interengaged with the planet gear 14 is a ring gear 18 adapted to be driven by the interaction between the planet gear 14 and the fixed speed sun gear 16.

All of the above gears and input means are journalled for rotation one-to-another and to the transmission housing 20 by a plurality of journal bearings generally indicated at 22.

The fixed speed sun gear 16 is mounted on an axially disposed fixed speed shaft 24 which is supported by journal bearings 22 in one wall of the transmission housing. The driven ring gear 18 has a second section 26 attached thereto and externally concentric to the fixed speed shaft 24 comprising a forward drive pinion 28 and a reverse drive ring gear 30.

The forward drive pinion 28 drives a driven pinion 32 which is mounted on the final output shaft 34 of the transmission.

Figure 3:
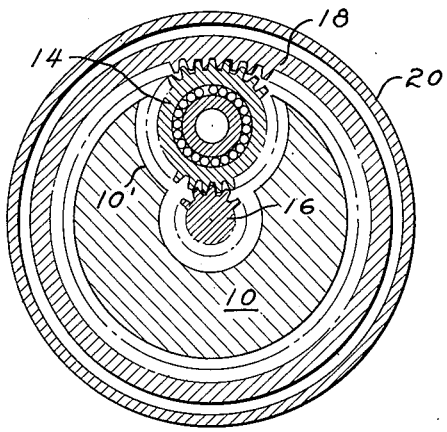
FIG. 3 is a detailed cross section taken along line 3—3 of FIG. 1.

Referring momentarily to FIG. 3, the mutally concentric relationship between the power input means or planet carrier 10, fixed speed sun gear 16 and the driven ring gear 18 is shown. The planet gear 14 is also shown interengaged with the sun and ring gears 16 and 18, respectively, and is journalled in an integral depression 10' in the body of the planet carrier 10 whereby it is forced to assume an orbital relationship with the sun gear 16.

Returning to FIG. 1, the fixed speed shaft 24 is connected, at the end opposite the integrally mounted sun gear 16, to one end of a torsion spring 36. The other end of the torsion spring 36 is connected to the central shaft 38 of an one-way brake member 40.

Externally concentric and operatively connected with the central shaft 38 of the one-way brake member 40 is a cylindrical ratchet wheel and brake drum 42. A timer (not shown) is driven by an electric motor 44 to control the speed of rotation of the ratchet wheel 42 which is also driven by the motor 44.

Figure 2:
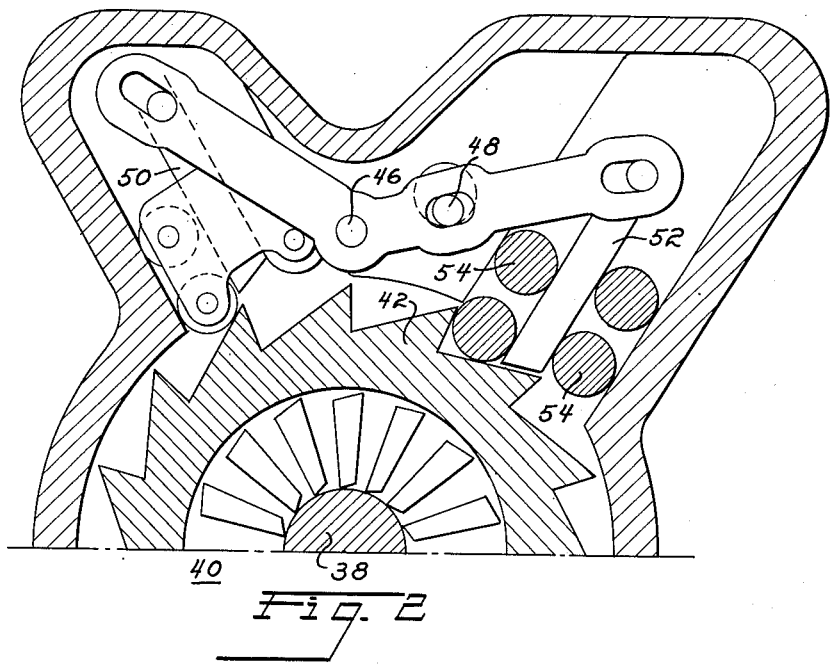
FIG. 2 is a detailed cross section taken along line 2—2 of FIG. 1.

Referring now to FIG. 2, the timer is shown as comprising a centrally pivoted double ratchet comprising a central pivot 46 and an eccentric drive coupling 48 for rocking the double ratchet about the central pivot 46. A pair of suspended ratchet teeth 50 and 52 on the left and right, respectively, as shown are mounted for reciprocation into and out of contact with the ratchet wheel 42 by means of anti-friction rollers 54 in response to the rocking motion of the double ratchet about the pivot.

Another embodiment of the invention is shown in FIGS. 4, 5, 6, and 7, which are now referred to.

In FIG. 4, the planetary drive system is the same as that in FIG. 1 as shown by the similar numerals thereon. The fixed speed shaft 24 extending from the fixed speed sun gear 16 has an enlarged intermediate portion 60 thereon which forms part of a one-way brake mechanism 61 so that the direction of rotation of the fixed speed shaft 24 is non-reversible.

Figure 6:
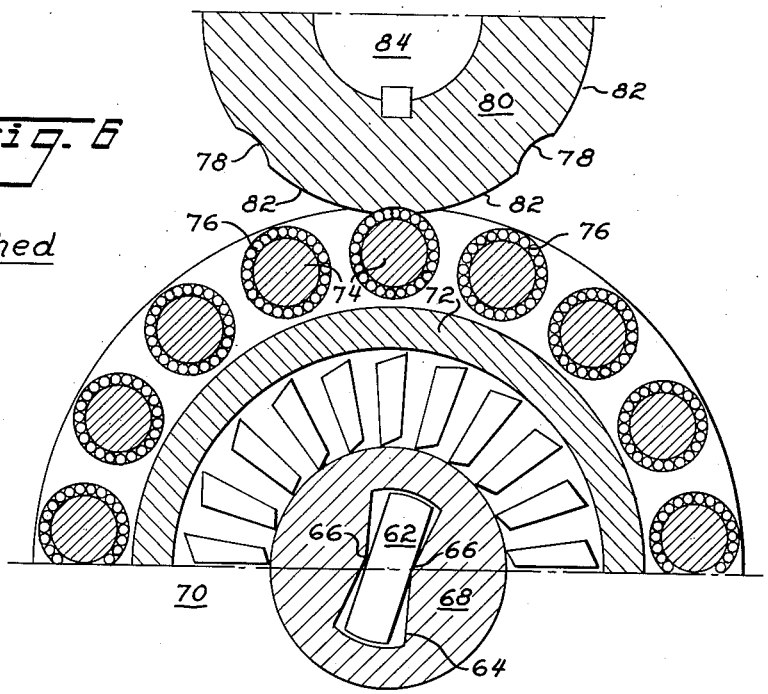
FIGS. 6 and 7 are detailed cross sections taken along line 6—6 of FIG. 4.
Figure 7:
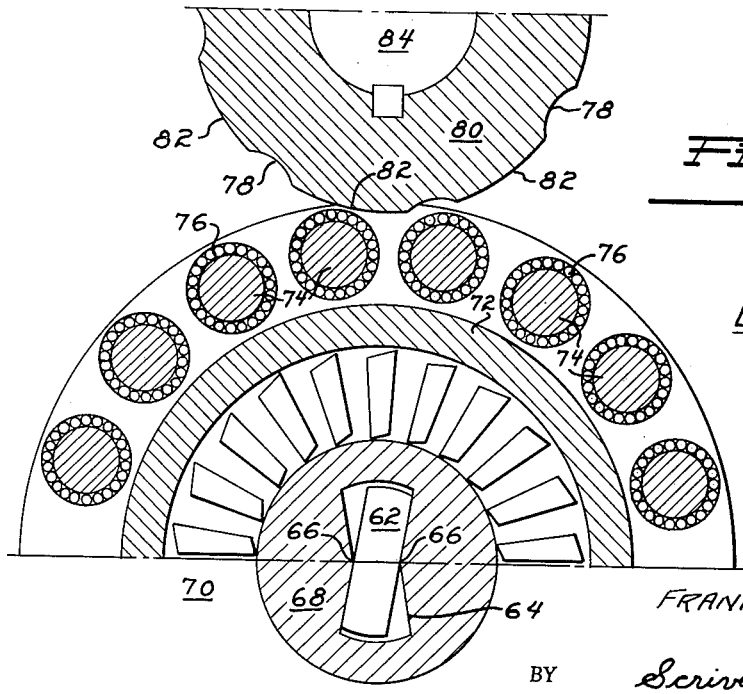

The fixed speed shaft 24 extends from the other side of the enlarged intermediate portion 60 to a key-shaped section 62 which is disposed in a double dovetail shaped locking slot 64 shown in FIGS. 6 and 7. The narrow portion of the double dovetail is positioned along a line through the axis of rotation of the fixed speed shaft 24 to allow for a small amount of rotational freedom of the key-shaped section 62 in the slot 64. The double dovetail slot 64 is located in a brake cylinder 68 which is externally concentric to the fixed speed shaft 24 and forms part of a one-way brake mechanism generally indicated at 70. A biasing spring 71 is provided to maintain the key-shaped section 62 in proper alignment in the locking slot 64.

Externally concentric with the brake cylinder 68 is a second brake cylinder 72 having a plurality of rollers 74 about the outer periphery and parallel to the axis of rotation thereof, mounted in bearings 76 for free rotation but fixed against translation with respect to a given position on the periphery of the second brake cylinder 72.

The rollers 74 are adapted to be engaged in a plurality of shaped grooves 78 on the outer periphery of a Geneva lock wheel 80. A series of lands 82 are alternately positioned with the grooves 78 to provide locking means between the Geneva lock wheel 80 and the second or outer brake cylinder 72 through means of the peripheral rollers 74.

The Geneva lock wheel 80 is shown in FIG. 4 to be mounted on a rotatable shaft 84 which is journalled in the transmission housing in driven relationship to a fixed speed drive motor 86.

The driving connection between the drive motor 86 and the rotating shaft 84 on which the Geneva lock wheel 80 is mounted is shown in FIG. 5. The motor shaft 88 is provided with an integral transverse pin 90 which engages a dovetailed slot 92 in the rotating shaft 84.

*Operation*

Referring to FIGS. 1, 2, and 3, the operation of the embodiment shown therein is as follows:

The power input means or planet carrier 10 in the planetary system is already connected to the output shaft of an engine or motor by means of the internal splines 12 therein.

Upon rotation of the engine shaft, the input means 10 rotates carrying with it the planet gear 14. As the orbital speed of the planet gear 14 increases in response to engine speed, the planet gear 14 accelerates the fixed speed shaft 24 from a condition of zero rotation up to a preselected fixed maximum speed thereof. This is accomplished by the interaction of the ring gear 18 with the fixed speed sun gear 16 mounted on the fixed speed shaft 24.

Initially, since the ring gear 18 is connected through pinions 28 and 32 to the output shaft 34 of the transmission, this gear is under load and tends to remain at rest rather than rotate. The fixed speed shaft 24 and the corresponding sun gear 16, on the other hand, are connected through the torsion spring 36 to the one-way brake member 40 which imposes no load thereon until the preselected maximum speed of the fixed speed shaft 24 is exceeded.

Therefore, the interaction between the initially fixed ring gear 18 and the orbiting planet 14 produces an acceleration of the fixed speed shaft 24 through the integral sun gear 16.

After the fixed speed shaft 24 has been accelerated to its preselected fixed maximum speed, the acceleration of the shaft must stop so that the planet gear 14 orbiting about the sun gear 16 will be able to impart a rotational force to the driven ring gear 18 and thereby impart a rotation to the output shaft 34 of the transmission.

The ratchet wheel and brake drum 42 is driven by the electric timer at a speed corresponding to the above defined fixed maximum speed of the fixed speed shaft 24. As long as the shaft 24 is accelerating, the connection of the ratchet wheel 42 through the one-way brake 40 provides no torque between the ratchet wheel 42 and the fixed speed shaft 24 until the speed of the shaft exceeds that of the ratchet wheel. The timer is thus protected from overload at low engine speeds.

When the fixed speed shaft 24 tends to exceed its maximum fixed speed, the one-way brake 40 engages and the shaft 24 acts to overdrive the ratchet wheel 42. When this occurs, the suspended ratchet teeth 50 and 52 which heretofore have been engaging and disengaging the ratchet wheel in synchronism therewith, are thrown out of synchronism due to the increased speed of the ratchet wheel 42. When this occurs, the ratchet wheel 42 is locked against rotation by means of the suspended ratchet teeth 50 and 52 and the resulting braking action is transmitted through the brake 40 and the torsion spring 36 to the fixed speed shaft 24 to bring the shaft back down to the selected maximum speed. As a result, the braking action on the shaft 24 and the integral sun gear 16 cause the orbiting planetary gear 14 to apply successive thrusts to the driven ring gear 18 to accelerate same. As the engine speed increases, the nature of the planetary system is such that the speed of the driven ring gear 18 will gradually overtake the engine speed as engine speed is increased, and the overall gear reduction in the system will be gradually reduced as the normal driving range is approached.

The latching system comprising the driven ratchet and associated ratchet wheel 42 and the torsion spring are so designed that the torque and speed variations induced by the locking action are all absorbed in the torsion spring 36. The resulting vibrations can be designed to occur at normal transmission noise frequencies so that they will not be in evidence.

Referring to FIGS. 4, 5, 6, and 7, the operation of the second embodiment of the invention, as shown therein, is as follows:

The planetary gear section on the left hand side of FIG. 4 and the cooperation of the fixed speed output shaft 24 therewith is the same as that described in conjunction with FIG. 1.

The fixed speed shaft 24 is connected through the one-way clutch 61 and key-shaped section 62 to the inner clutch cylinder 68 by means of the double dovetail shaped slot 64. The speed of the shaft 24 at any instant is reflected through the one-way brake 70 to the outer brake cylinder 72, rollers 74 and Geneva lock wheel 80 if the speed of the shaft 24 tends to exceed the predetermined maximum fixed speed.

The Geneva lock wheel 80 is driven by the electric motor 86 at a speed equal to the maximum fixed speed of the fixed speed shaft 24. Thus, the Geneva lock wheel 80, by means of the spaced grooves 78 on its periphery, drives the outer brake cylinder 72 through the interaction of the grooves 78 with the rollers 74 at a speed equal to the preselected maximum fixed speed of the fixed speed shaft 24.

If the speed of the shaft 24 is below maximum, the one-way brake is not engaged and the outer brake cylinder 72 overruns the inner brake cylinder 68 into which the fixed speed shaft 24 is keyed.

However, if the speed of the shaft 24 and hence the inner brake cylinder 68 tends to exceed the maximum fixed speed value, the brake 70 engages and overdrives the outer brake cylinder 72 and rollers 74 with respect to the Geneva lock wheel 80. This causes the rollers 74 on the outer brake cylinder to be driven out of synchronism with the grooves 78 on the periphery of the Geneva lock wheel.

Ahe a result, the rollers 74 bind on the lands 82 intermediate the grooves 78 and instantaneously lock the outer brake cylinder 72 against rotation which imparts a braking action to the inner brake cylinder 68. This braking action is transmitted through the one-way brake 61 and fixed speed shaft 24 to the sun gear 16. As described in conjunction with FIG. 1, the driven ring gear 18 and the output shaft 34 of the transmission are now accelerated. The resulting gear reduction in the planetary system causes the driven ring gear 18 to start at lower than engine speed and gradually overtake the engine speed as it increases. The overall gear reduction of the system, therefore, is gradually reduced as the normal driving range is approached.

The purpose of the double dovetail shaped locking slot 64 will now become apparent. The fixed speed shaft 24 is dovetailed into this slot by means of a key-shaped section 62 and is allowed to rotate freely therein through a limited angle of rotation equal to the increments of rotation of the Geneva lock wheel 80 between points of engagement of the peripheral grooves 78 and rollers 74. Thus, it can be seen that in order for the fixed shaft to be blocked by the lock mechanism, it must first overtake and tend to exceed the speed of the lock mechanism.

The locking mechanism should be designed such that the dwell time of each locking action is of the same order of magnitude with the vibrational period of natural transmission noise. In this manner, no apparent vibrations are induced by the locking action.

As can be seen from the above description and drawings, the invention provides an automatic transmission which provides a continuous gear reduction without the incorporation of highly expensive torque converters and other high cost equipment.

It is to be understood that the embodiments shown herein are for the purpose of example only and are not intended to limit the scope of the appended claims.

What is claimed is:

1. In an automatic transmission, in combination, a power input means, a driven gear, a sun gear having a preselected maximum speed of rotation internally concentric with said power input means and said driven gear, planet gear means driven about said sun gear by said power input means and interengaged with said sun gear and said driven gear, speed control means for applying intermittent braking forces to said sun gear when said sun gear tends to exceed said preselected maximum speed, and elastic torque transmitting means interconnecting said sun gear and said speed control means, said speed control means comprising a drive means, a Geneva lock wheel driven by said drive means at a speed equal to said maximum speed, lands and grooves on the periphery of said lock wheel parallel to the axis of rotation thereof, one-way brake means operatively connected with said lock wheel having external and internal brake cylinders, and a plurailty of rollers on the periphery of said external brake cylinder spaced so as to engage said grooves in the periphery of said lock wheel and be driven thereby to rotate said outer brake cylinder in synchronism with said lock wheel; said internal brake cylinder being driven by said sun gear at the same speed as said sun gear, whereby said sun gear tends to overdrive said external brake cylinder when the speed of said sun gear tends to exceed said maximum fixed speed; whereby, said peripheral rollers on said external brake cylinder are thrown out of synchronism with said peripheral grooves on said lock wheel and into contact with said peripheral lands to lock said external brake cylinder against rotation and impart a braking force to said sun gear through said one-way brake.

2. In an automatic transmission, in combination, a power imput means, a driven gear, a sun gear having a preselected maximum speed of rotation internally concentric with said power input means and said driven gear, planet gear means driven about said sun gear by said power input means and interengaged with said sun gear and driven gear, a rotary shaft integral with and driven by said sun gear and speed control means for said sun gear operatively connected to said rotary shaft comprising a drive means and locking means driven by said drive means at said preselected maximum speed of rotation of said sun gear for applying a braking force to said rotary shaft when said sun gear tends to exceed said preselected maximum speed.

3. The device as described in claim 2 wherein said locking means comprises a Geneva lock wheel driven by said drive means at a speed equal to said maximum speed, lands and grooves on the periphery of said lock wheel parallel to the axis of rotation thereof, one-way brake means operatively connected with said lock wheel having external and internal brake cylinders, and a plurality of rollers on the periphery of said external brake cylinder spaced so as to engage said grooves in the periphery of said lock wheel and be driven thereby to rotate said outer brake cylinder in synchronism with said lock wheel; said internal brake cylinder being driven by said integral shaft at the same speed as said shaft, whereby said shaft tends to overdrive said external brake cylinder when the speed of said shaft tends to exceed said maximum fixed speed; whereby, said peripheral rollers on said external brake cylinder are thrown out of synchronism with said peripheral grooves on said lock wheel and into contact with said peripheral lands to lock said external brake cylinder against rotation and impart a braking force to said integral shaft and sun gear through said one-way brake.

4. In an automatic transmission, in combination, a power input means, a driven gear, a sun gear having a preselected maximum speed of rotation internally concentric with said power input means, and said driven gear, planet gear means driven about said sun gear by said power input means and interengaged with said sun gear and driven gear, elastic torque transmitting means coupled at one end to said sun gear, and speed control means for said sun gear including a one-way brake having driving and driven parts and a drive means, said driven part being connected with said elastic torque transmitting means at the other end thereof and thus being driven by said sun gear, said driving part being connected with said drive means and driven thereby at said preselected maximum speed, whereby no torque is imposed on said sun gear by said speed control means through said brake means when the speed of said sun gear is below said maximum speed of rotation and a braking force is applied to said sun gear by said brake through said elastic torque transmitting means when the speed of said sun gear tends to exceed said maximum speed of rotation to thereby prevent said sun gear from exceeding said maximum speed.

5. The invention defined in claim 2, wherein said locking means comprises an oscillatory double ratchet driven by said drive means at a rate corresponding to said maximum speed of rotation, a ratchet wheel in operative relationship with said double ratchet driven by said drive means at a speed equal to said maximum speed in synchronous relationship with said double ratchet, said ratchet wheel forming one side of an one-way brake having its other side connected to said rotary shaft, said shaft acting through said one-way brake to drive said ratchet wheel out of synchronism with said ratchet and lock said ratchet wheel against rotation when said shaft exceeds said maximum speed to thereby impart a braking force to said shaft.

6. The invention defined in claim 2, wherein said rotary shaft includes an elastic torque transmitting means between said sun gear and said speed control means.

7. In combination with an automatic transmission of the planetary gear variety including three elements drivably interconnected, means for positively driving one of said elements to impart rotary motion to the other two of said elements, means for limiting the speed of rotation of a second of said three elements to a predetermined rotational rate comprising a drive means, locking means operatively connected with said drive means so as to be driven thereby at said predetermined rate, said locking means being brakingly engageable with said second element, means normally retaining said locking means out of braking engagement with said second element, and means for effecting braking engagement between said second element and said locking means whenever the speed of said second element tends to exceed the speed of said locking means, whereby the speed of said second element is prevented from exceeding the speed of said locking means.

References Cited in the file of this patent

UNITED STATES PATENTS

| | | |
|---|---|---|
| 885,207 | Whitcomb | Apr. 21, 1908 |
| 1,948,847 | Dodge | Feb. 27, 1934 |
| 2,597,357 | McCormick | May 20, 1952 |
| 2,939,329 | Doerries | June 7, 1960 |